Aug. 31, 1943.  E. MONTANO  2,328,354
BABY FEEDING DEVICE
Filed Sept. 15, 1942

INVENTOR.
ELIZABETH MONTANO
BY A. B. Bowman
ATTORNEY

Patented Aug. 31, 1943

2,328,354

UNITED STATES PATENT OFFICE 2,328,354

BABY FEEDING DEVICE

Elizabeth Montano, Palm City, Calif.

Application September 15, 1942, Serial No. 458,396

3 Claims. (Cl. 215—11)

My invention relates to a baby feeding device to take the place of the conventional glass milk bottle and nipple and the objects of my invention are:

First, to provide a baby feeding device of this class in which paper or similar cups are used and then thrown away;

Second, to provide a device of this class in which the paper cup is provided with an outside support;

Third, to provide a device of this class with a new and novel nipple for use in connection with the feeding device;

Fourth, to provide a new and novel nipple support in connection with the paper milk container holder;

Fifth, to provide a device of this class which eliminates the use of rubber and glass in connection with feeding devices of this class; and Sixth, to provide a baby feeding device of this class which is very simple and economical of construction, easy to use, efficient in its action and which will not readily deteriorate or get out of order.

Figure 3:
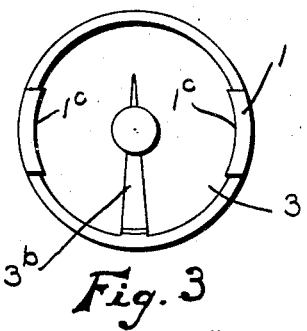
Figure 2:
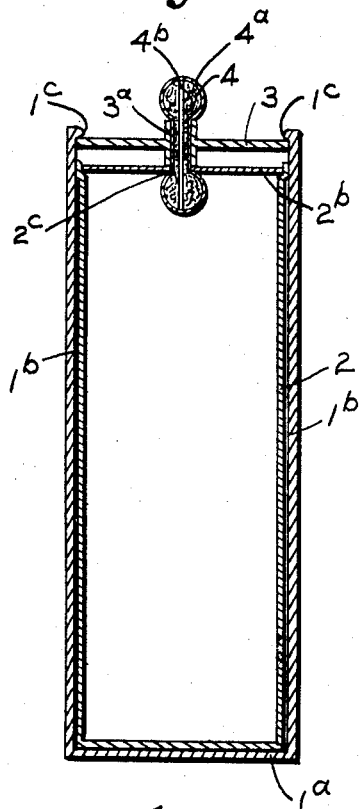
Figure 1:
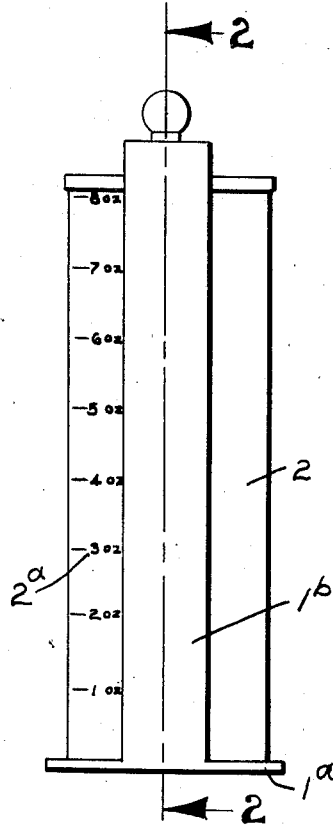

With these and other objects in view as will appear hereinafter, my invention consists of certain novel features of construction, combination and arrangement of parts and portions as will be hereinafter described in detail and particularly set forth in the appended claims, reference being had to the accompanying drawing and to the characters of reference thereon which form a part of this application in which:

Figure 1 is a side elevational view of my feeding device complete and ready for use; Fig. 2 is a longitudinal sectional view taken from the line 2—2 of Fig. 1 and Fig. 3 is a top view.

Similar characters of reference refer to similar parts and portions throughout the several views of the drawing.

The milk receptacle holder 1, milk receptacle 2, holder lid 3 and nipple 4 constitute the principal parts and portions of my baby feeding device.

The milk receptacle holder 1 is provided with a flat circular base portion 1a which is provided with two upwardly extending upright portions 1b which are preferably integrally connected therewith and preferably made of plastic or wood. The upper ends of these upright portions 1b are provided with inwardly turned ledge portions 1c, as shown best in Fig. 2 of the drawing.

Arranged to fit between the members 1b and rest on the base 1a is a paper cup member 2 which may be made of any cheap material so that when it is used once it may be thrown away. It should be made of partly transparent material, however, so that the quantity or heighth level of the fluid in the cup member 1 may be readily determined from the outside. The paper cup member is provided with ounce markings 2a on its outer side as shown best in Fig. 1 of the drawing. This paper cup member is provided with a lid 2b which is pressed into the upper end, as shown best in Fig. 2 of the drawing. (This lid is provided with a central hole 2c for receiving the one end of the nipple member 4. This lid 2b is pressed into the upper end of the cup 2 in the conventional manner to provide a tight fit. Positioned between the members 1b at their upper ends is the holder lid 3 which is provided with a hub portion 3a which is adapted to receive the one end of the nipple 4 and said holder lid and hub portion are provided with a wedge-shaped slotted portion 3b to permit the lid 3 to be compressed so that it will fit under the ledges 1c to form a clamp for clamping the lid in position in connection with the upper ends of the uprights 1b. It also forms a clamp for the nipple 4.

The nipple 4 is preferably made of synthetic sponge or sponge rubber adapted to draw and hold the milk from the milk receptacle 2. It is provided with a fabric covering 4a which may be of linen or similar material which is easy to wash and sterilize. The sponge portion is provided with an opening 4b therethrough to facilitate the passage of milk therethrough but may be dispensed with if desired.

The operation of my baby feeding device is substantially as follows: The proper quantity of milk or other liquid baby food is placed in the milk receptacle 2 and the lid 2b placed thereon. Then the milk receptacle 2 is positioned in the milk receptacle holder 1 and the holder lid 3 placed in position thereover so that the holes 3a and 2c coincide. The nipple then is forced with one end through the opening 3a and 2c being compressed at the middle and extended at its outer end as shown best in Fig. 2 of the drawing and it is then ready for use. After it has been used the nipple is withdrawn, the lid 3 compressed and removed and the milk receptacle 2 and lid 2b are thrown away, the nipple 4 being sterilized before being used again.

Though I have shown and described a particular construction, combination and arrangement of parts and portions, I do not wish to be limited to this particular construction, combination and arrangement but desire to include in the scope of my invention the construction, combination and arrangement substantially as set forth in the appended claims.

Having thus described my invention, what I claim as new and desire to secure by Letters Patent is:

1. In a baby feeding device of the class described, the combination of a paper receptacle, a lid therefor provided with a central opening, a holder for said paper receptacle provided with a lid with a conforming central opening and a nipple extending through the opening in both lids and with its opposite ends extended.

2. In a baby feeding device of the class described, the combination of a paper receptacle, a lid therefore provided with a central opening, a holder for said paper receptacle provided with a lid with a conforming central opening and a nipple extending through the opening in both lids and with its opposite ends extended, said nipple composed of sponge-like material.

3. In a baby feeding device of the class described, the combination of a paper receptacle, a lid therefor provided with a central opening, a holder for said paper receptacle provided with a lid with a conforming central opening, a nipple extending through the opening in both lids and with its opposite ends extended, said nipple composed of sponge-like material and a fabric covering for said sponge-like material.

ELIZABETH MONTANO.